United States Patent
Mukherjee et al.

(10) Patent No.: US 10,846,239 B2
(45) Date of Patent: Nov. 24, 2020

(54) MANAGING TRANSLATION LOOKASIDE BUFFER ENTRIES BASED ON ASSOCIATIVITY AND PAGE SIZE

(71) Applicant: Marvell International Ltd., Hamilton (BM)

(72) Inventors: Shubhendu Sekhar Mukherjee, Southborough, MA (US); Richard Eugene Kessler, Northborough, MA (US); Michael Bertone, Marlborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 21 days.

(21) Appl. No.: 16/204,722

(22) Filed: Nov. 29, 2018

(65) Prior Publication Data

US 2020/0174945 A1 Jun. 4, 2020

(51) Int. Cl.
*G06F 12/1036* (2016.01)

(52) U.S. Cl.
CPC .. *G06F 12/1036* (2013.01); *G06F 2212/1044* (2013.01); *G06F 2212/657* (2013.01)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595;
(Continued)

(56) References Cited

U.S. PATENT DOCUMENTS

| 5,542,062 A | * | 7/1996 | Taylor | ................. G06F 12/0888 |
| | | | | 711/118 |
| 5,724,538 A | * | 3/1998 | Morris | ................ G06F 12/1018 |
| | | | | 711/206 |

(Continued)

OTHER PUBLICATIONS

T. D. Tran, T. D. Hoang and L. B. Le, "Caching for Heterogeneous Small-Cell Networks With Bandwidth Allocation and Caching-Aware BS Association," in IEEE Wireless Communications Letters, vol. 8, No. 1, pp. 49-52, Feb. 2019 (Year: 2019).*

(Continued)

*Primary Examiner* — Daniel C. Chappell
(74) *Attorney, Agent, or Firm* — Young Basile Hanlon & MacFarlane, P.C.

(57) ABSTRACT

A first cache module, comprising fully associative cache circuitry, provides TLB entries for a first group of multiple page sizes. A second cache module, comprising set associative cache circuitry, provides TLB entries for a second group of multiple page sizes. Managing TLB entries includes: performing a search in the first cache module based on selected tag bits of a target virtual address that are selected for each TLB entry in the first cache module based on information stored in the first cache module corresponding to one of the multiple pages sizes in the first group, and performing multiple search iterations in the second cache module based on selected index bits and selected tag bits of the target virtual address, where quantities of bits in the selected index bits and the selected tag bits are different for each of the search iterations.

21 Claims, 4 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153
See application file for complete search history.

(56) References Cited

U.S. PATENT DOCUMENTS

| | | | | |
|---|---|---|---|---|
| 5,751,990 | A * | 5/1998 | Krolak | G06F 12/1063 |
| | | | | 711/118 |
| 5,907,867 | A * | 5/1999 | Shinbo | G06F 12/1027 |
| | | | | 711/207 |
| 6,112,285 | A * | 8/2000 | Ganapathy | G06F 12/1027 |
| | | | | 711/203 |
| 6,493,812 | B1 * | 12/2002 | Lyon | G06F 12/1054 |
| | | | | 711/108 |
| 7,752,417 | B2 * | 7/2010 | Manczak | G06F 11/3466 |
| | | | | 711/209 |
| 7,802,055 | B2 | 9/2010 | Sartorius et al. | |
| 8,166,239 | B2 * | 4/2012 | Fertig | G06F 12/1036 |
| | | | | 711/108 |
| 8,386,749 | B2 * | 2/2013 | Dannowski | G06F 12/1036 |
| | | | | 711/207 |
| 8,856,490 | B2 * | 10/2014 | Chen | G06F 12/1027 |
| | | | | 711/207 |
| 9,779,028 | B1 * | 10/2017 | Mukherjee | G06F 12/1027 |
| 10,037,228 | B2 * | 7/2018 | Barrow-Williams | |
| | | | | G06F 9/5027 |
| 10,223,279 | B2 * | 3/2019 | Mukherjee | G06F 12/1063 |
| 10,545,673 | B2 * | 1/2020 | van Riel | G06F 12/0891 |
| 2007/0250666 | A1 | 10/2007 | Sartorius et al. | |
| 2011/0283040 | A1 * | 11/2011 | Chadha | G06F 12/1009 |
| | | | | 711/3 |
| 2012/0137079 | A1 | 5/2012 | Ueda | |
| 2015/0089184 | A1 * | 3/2015 | Mukherjee | G06F 12/1036 |
| | | | | 711/206 |
| 2015/0100753 | A1 * | 4/2015 | Shen | G06F 12/1036 |
| | | | | 711/207 |
| 2016/0140042 | A1 * | 5/2016 | Mukherjee | G06F 12/0891 |
| | | | | 711/123 |
| 2016/0342523 | A1 * | 11/2016 | Rozario | G06F 12/1027 |
| 2017/0371799 | A1 * | 12/2017 | Mukherjee | G06F 12/0842 |
| 2018/0173641 | A1 * | 6/2018 | Parker | G06F 12/1009 |
| 2018/0203806 | A1 * | 7/2018 | Moudgill | G06F 12/1009 |

OTHER PUBLICATIONS

Cao Xiangrong and Zhang Xiaolin, "An efficient search algorithm for cache simulation platform," 2013 IEEE 4th International Conference on Software Engineering and Service Science, Beijing, 2013, pp. 1055-1058 (Year: 2013).*

* cited by examiner

MANAGING TRANSLATION LOOKASIDE BUFFER ENTRIES BASED ON ASSOCIATIVITY AND PAGE SIZE

BACKGROUND

The invention relates to managing translation lookaside buffer entries based on associativity and page size.

Modern processors support virtual memory, which allows program instructions being executed by a CPU to refer to virtual addresses within a virtual address space that is larger than a physical address space that is defined by the size of main memory. Virtual memory involves address translation of a virtual address (VA) from each of one or more such virtual address spaces into a physical address (PA) from a physical address space. The translation is performed using a page table, a data structure that stores mappings between virtual addresses and physical addresses (also called "translations"). The page table also contain a variety of other information, such as access permission for each page. Memory referenced by the page table is divided up in blocks of a predetermined number of bytes often referred to as memory pages (or simply "pages" or "blocks"). There may be different sized pages, each containing a different number of bytes of memory. Translation is performed at the granularity of pages. The lowest order bits of the virtual address and physical address, called the "page offset," are typically identical, such that data occurring at a particular location in a virtual page occurs at the same relative location in a corresponding physical page. Copies of these translations can be stored within a processor or core, in storage circuitry called a translation lookaside buffer (TLB), which acts as a cache for translations.

Another kind of virtualization involves virtual machines (VMs), where one or more guest operating systems each run in its own separate VM while sharing the same host physical system hardware. A hypervisor (also called a virtual machine monitor (VMM)) runs on the host physical computing system to manage all of the guest operating systems of a virtualized system. The hypervisor runs at higher-privileged access level than the guest operating systems. So, only the hypervisor has access to the physical address space. Therefore, each guest operating system is provided its own intermediate physical address space into which one or more virtual address spaces are translated, and the hypervisor translates intermediate physical addresses (IPAs) into physical addresses. In such a virtualized system, both the guest operating systems and the hypervisor have their own page tables to translate VAs to IPAs and IPAs to PAs, respectively.

SUMMARY

In one aspect, in general, an integrated circuit comprises: a first cache module comprising fully associative cache circuitry, the first cache module configured to provide translation lookaside buffer (TLB) entries storing copies of translations mapping virtual pages to physical pages for a first group of multiple page sizes, and configured to search for a TLB entry storing a translation corresponding to a provided virtual address based on tag bits of the provided virtual address; a second cache module comprising set associative cache circuitry, the second cache module configured to provide TLB entries storing copies of translations mapping virtual pages to physical pages for a second group of multiple page sizes, and configured to search for a TLB entry storing a translation corresponding to a provided virtual address based on index bits of the provided virtual address and tag bits of the provided virtual address; and circuitry configured to manage TLB entries in the first and second cache modules. The managing includes: receiving a target virtual address, performing a search in the first cache module based on selected tag bits of the target virtual address that are selected for each TLB entry in the first cache module based on information stored in the first cache module corresponding to one of the multiple pages sizes in the first group, and performing multiple search iterations in the second cache module based on selected index bits and selected tag bits of the target virtual address, where quantities of bits in the selected index bits and the selected tag bits are different for each of the search iterations.

In another aspect, in general, a method comprises: providing, from a first cache module comprising fully associative cache circuitry, translation lookaside buffer (TLB) entries storing copies of translations mapping virtual pages to physical pages for a first group of multiple page sizes, and searching for a TLB entry in the first cache module storing a translation corresponding to a provided virtual address based on tag bits of the provided virtual address; providing, from a second cache module comprising set associative cache circuitry, TLB entries storing copies of translations mapping virtual pages to physical pages for a second group of multiple page sizes, and searching for a TLB entry in the second cache module storing a translation corresponding to a provided virtual address based on index bits of the provided virtual address and tag bits of the provided virtual address; and managing TLB entries in the first and second cache modules. The managing includes: receiving a target virtual address, performing a search in the first cache module based on selected tag bits of the target virtual address that are selected for each TLB entry in the first cache module based on information stored in the first cache module corresponding to one of the multiple pages sizes in the first group, and performing multiple search iterations in the second cache module based on selected index bits and selected tag bits of the target virtual address, where quantities of bits in the selected index bits and the selected tag bits are different for each of the search iterations.

Aspects can include one or more of the following features.

Receiving the target virtual address comprises receiving a TLB invalidation instruction for invalidating at least one translation corresponding to the target virtual address.

Each of the multiple search iterations is performed based on a different one of the multiple pages sizes in the second group.

The multiple search iterations are performed based on successively larger pages sizes.

A total quantity of TLB entries provided by the second cache module is greater than a total quantity of TLB entries provided by the second cache module, and a maximum page size of the second group of multiple page sizes is smaller than a minimum page size of the first group of multiple page sizes.

The page sizes in the second group of multiple page sizes is configurable based on instructions executed in the processor in the integrated circuit.

The page sizes in the first group of multiple page sizes is configurable based on instructions executed in a processor in the integrated circuit.

The search in the first cache module and an initial search iteration in the second cache module are performed at least partially concurrently.

The information stored in the first cache module corresponding to one of the multiple pages sizes in the first group comprises information in each TLB entry in the first cache module storing a valid translation that indicates which bits of the provided virtual address correspond to a virtual page number.

The information in each TLB entry in the first cache module storing a valid translation comprises a bit mask.

Aspects can have one or more of the following advantages.

The techniques described herein ensure correct operation of the integrated circuit and its translation circuitry, including translation lookaside buffer circuitry. Generally, a TLB is able to speed pipeline performance by caching translations, avoiding the need to access a page table stored in main memory. Part of managing a TLB includes managing invalidation of entries storing translations that are no longer valid. For example, to aid in maintaining the state of a TLB, or maintaining consistent state among multiple processor cores, an instruction set architecture may provide different types of invalidation instructions that are broadcast among the cores to ensure an entry in a TLB is consistently removed or marked as being invalid. In particular, a TLB invalidate (TLBI) instruction can be used to invalidate entries in a TLBs.

In the case of managing coherence among TLBs, when a translation is changed, in addition to updating the page table, any copy of the old translation that may be stored in a TLB of a core is invalidated. In that scenario, a TLBI instruction is broadcast to each core, specifying (explicitly or implicitly) one or more translations to be invalidated. Some TLBI instructions invalidate translations for multiple virtual addresses implicitly (e.g., based on context information, such as an exception level, or other information) without specifying a particular virtual address, and some TLBI instructions, called "address-based" TLBI instructions, invalidate translations for virtual addresses by explicitly indicating a particular address (for a particular memory page) whose translation is now invalid. When a particular core issues such an invalidation instruction, the invalidation instruction is performed at that particular (local) core and is also broadcast to all other (remote) cores in the processor, or all remote cores within a socket, or possibly within multiple sockets.

The techniques described herein ensure that access to a TLB can be performed efficiently, for example when invalidating entries, while also allowing a relatively large number of entries to be stored. Challenges associated with the existence of multiple pages sizes are also mitigated, as described in more detail below.

Other features and advantages of the invention will become apparent from the following description, and from the claims.

DESCRIPTION

Figure 1:
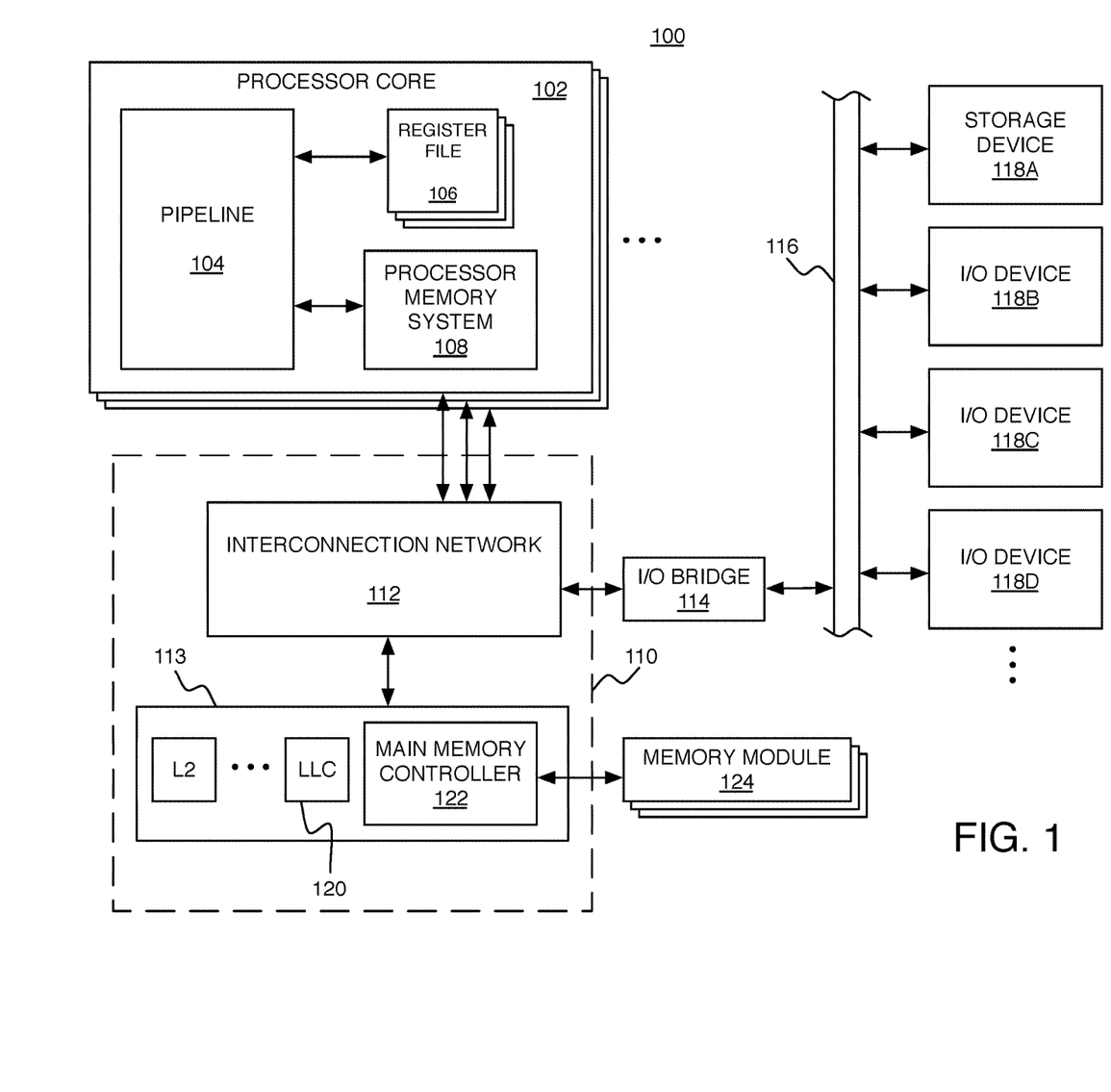
FIG. 1 is a schematic diagram of a computing system.

FIG. 1 shows an example of a computing system 100 in which the techniques described herein can be used. The system 100 includes one or more processor cores 102, where each processor core 102 (or each "core") comprises an individual central processing unit (CPU) with associated circuitry. In this example of a multi-core architecture, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a conditional branch instruction to determine whether or not the branch will be taken. Finally, an instruction is committed, which may involve storing a result (e.g., in a write back (WB) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time).

Figure 2:
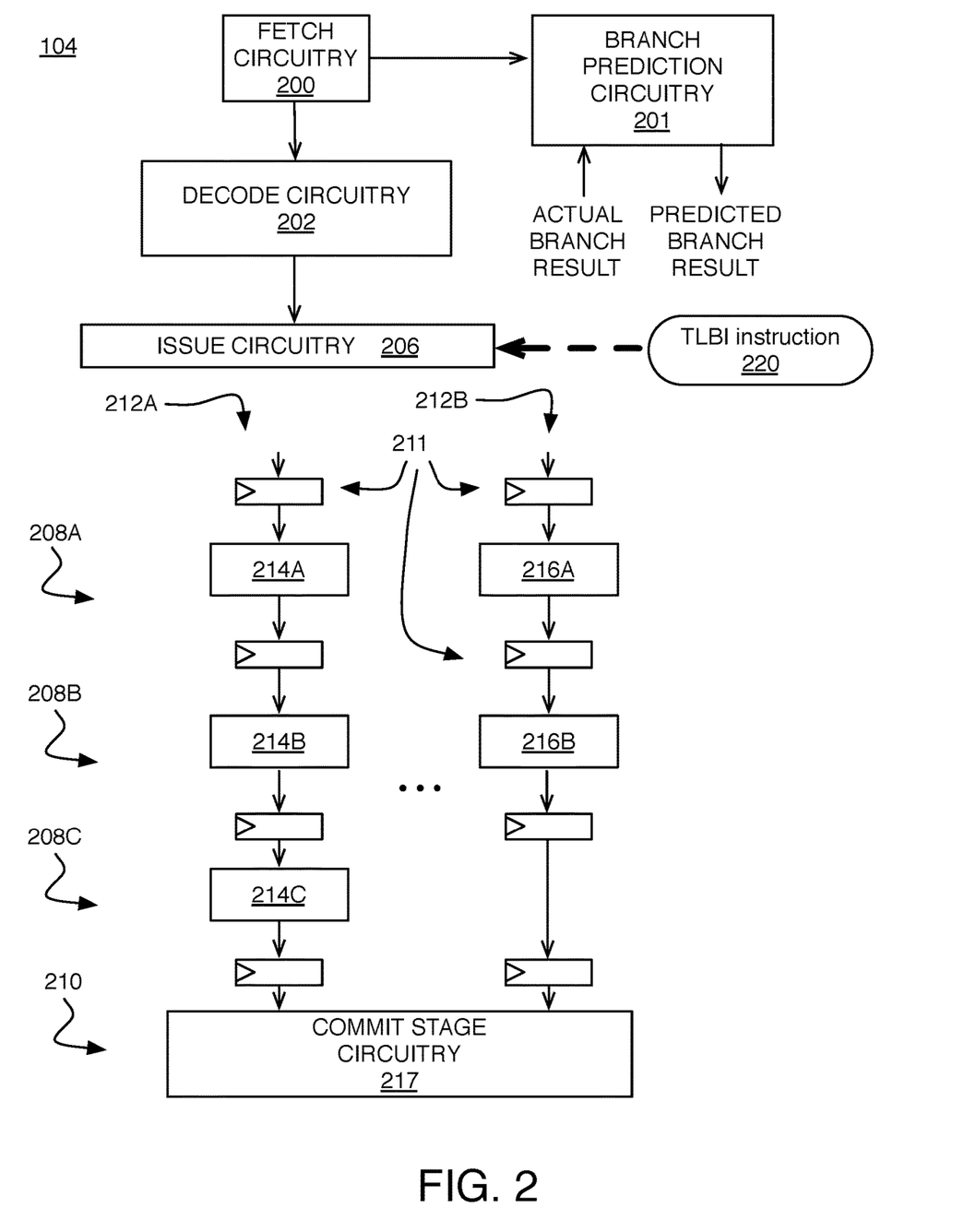
FIG. 2 is a schematic diagram of a processor core pipeline.

FIG. 2 shows an example in which the pipeline 104 is configured to receive external instructions, such as TLBI instructions, which are inserted into the pipeline and processed in an efficient manner using the TLBI modules that handle TLBI instructions based on page size, as will be described in more detail below. The pipeline 104 includes circuitry for the various stages. For one or more instruction fetch stages, instruction fetch circuitry 200 provides a PC to an instruction cache in the processor memory system 108 to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions. The branch prediction circuitry 201 also stores branch history information that is updated based on a received actual branch result. In some implementations, some or all of the branch prediction circuitry 201 is considered part of the fetch circuitry 200. For one or more instruction decode stages, instruction decode circuitry 202 stores information in a buffer for instructions in the instruction window waiting to be issued.

Issue circuitry 206 determines in which cycle each of the instructions in the buffer are to be issued, which makes them available to progress through circuitry of the execution stages 208A, 208B, and 208C of the pipeline 104. (For simplicity, this example has three execution stages, but other examples may have more or fewer execution stages.) There is also at least one commit stage 210 that commits results of instructions that have made their way through the execution stages 208A, 208B, and 208C. For example, commit stage circuitry 217 may write back a result into a register file 106 (FIG. 1).

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include units for various operations (e.g., ALU, multiplier, floating point unit), and another path may include circuitry for performing memory access instructions, including load instructions that read data values from the memory system, and store instructions to write data values to the memory system. This circuitry also initiates translation of virtual addresses to physical addresses when necessary, and aids in management of the TLB within the processor memory system 108. External instructions received from other processor cores, such as a TLBI instruction 220 may be inserted into the pipeline 104 by the issue circuitry 206 to be handled at the appropriate stage for invalidating entries in the TLB in that particular processor core.

Figure 3:
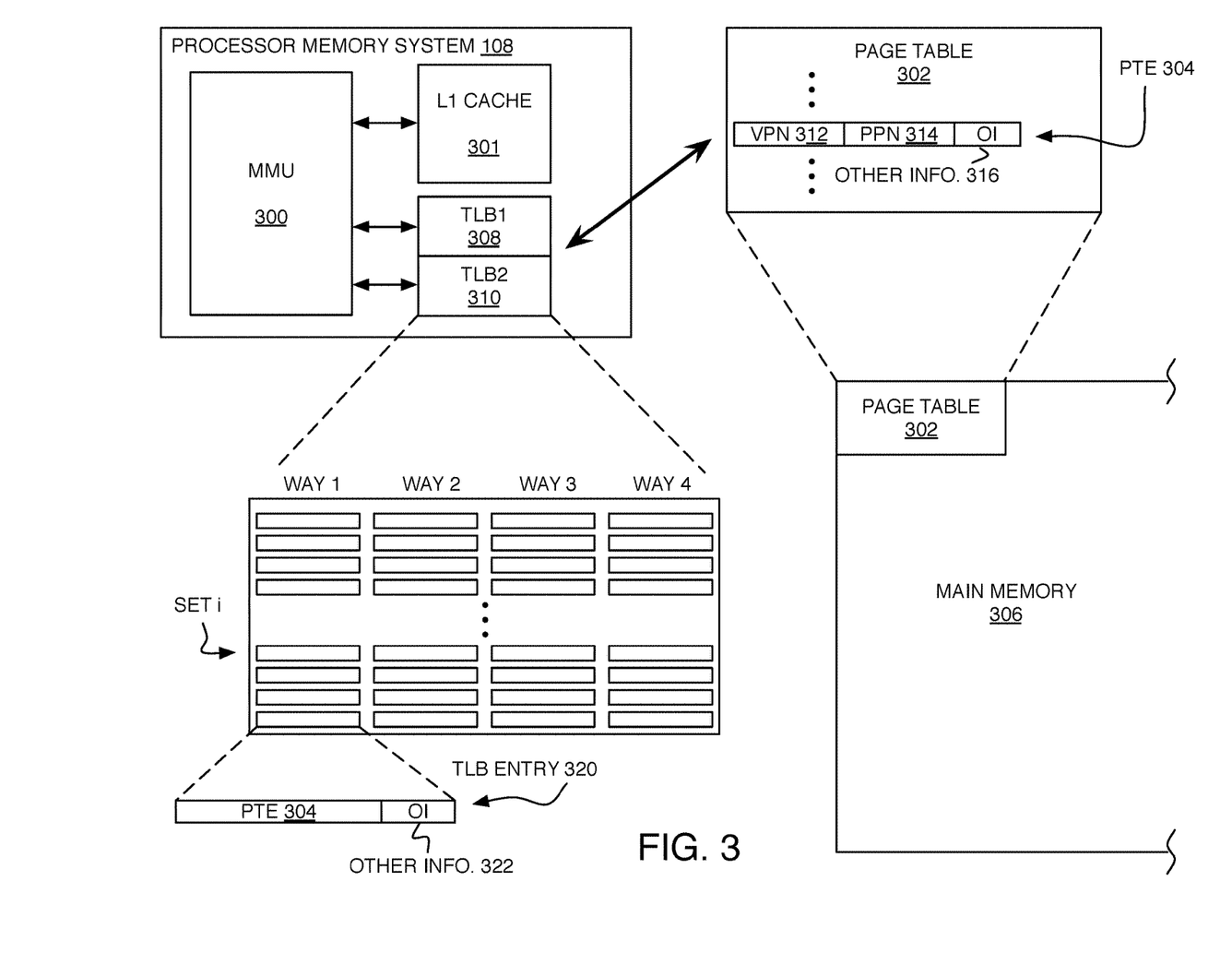
FIG. 3 is a schematic diagram of a processor memory system with translation lookaside buffer modules.

FIG. 3 shows an example of processor memory system 108 that is configured to handle TLBI instructions associated with different page sizes in an efficient manner. In this example, the processor memory system 108 includes a memory management unit (MMU) 300 that manages access to the memory system, including the translation of virtual addresses to physical addresses. The MMU 300 determines whether a copy of a stored value (e.g., data or an instruction) at a given virtual address is present in any of the levels of the hierarchical cache system, from an L1 cache 301 up to the LLC 120 (FIG. 1) if necessary. If so, then the instruction accessing that virtual address can be handled using the cache system. If not, then that instruction can be handled by miss circuitry to be executed after accessing the value from main memory 306. But, the main memory 306, and potentially one or more levels of the cache system, may need to be accessed using a physical address (PA) translated from the virtual address (VA). So, the processor memory system 108 also includes a TLB, which in this example includes two TLB modules, shown in FIG. 3 as TLB1 308 and TLB2 310 (referred to below as simply TLB1 and TLB2). The purpose of the two different TLB modules is to facilitate faster access, as will be explained in more detail below. Other examples may have more or fewer TLB modules.

A page table 302 has entries that store VA-to-PA mappings, which are also called a page table entry (PTE) 304. The page table 302 is typically stored in main memory 306 along with physical memory pages that represent corresponding mapped virtual memory pages that have been "paged in" from secondary storage (e.g., storage device 118A). Alternatively, in a virtualized system with one or more guest operating systems managed by a hypervisor, virtual addresses (VAs) may be translated to intermediate physical addresses (IPAs), which are translated to physical addresses (PAs). In a virtualized system, the translation by a guest operating system of VAs to IPAs may be handled entirely in software, or the guest operating system may have some hardware assistance from the MMU 300.

The TLB modules TLB1 and TLB2 are used for caching recently used PTEs from the page table 302. This enables the translation to be performed in response to a load or store instruction, for example, without necessarily having to access the main memory 306 to retrieve a PTE 304. In this example, a PTE 304 of the page table 302 stores a virtual page number 312 and a physical page number 314, which serve as a mapping between a VA and a PA that defines a translation of that VA. The low order bits consisting of the page offsets are identical for a VA and its mapped PA, which leaves the high order bits consisting of the page numbers to specify the mapping. The PTE 304 also includes other information (OI) 316, such as information indicating whether or not the page is resident in main memory 306 or needs to be retrieved from secondary storage. When the PTE 304 is stored in an entry 320 of any of the TLB modules, there is also other information (OI) 322 for managing the transfer of PTEs between the full page table 302 and the TLB modules, and for invalidating PTEs in the TLB modules (e.g., by toggling a valid bit). The OI 322 can include full or partial context information, or an identifier that maps to context information, as described in more detail below.

In this example, the TLB1 is implemented using fully associative cache circuitry, and the TLB2 is implemented using N-way set associative cache circuitry. Reasons why such a combination of types of cache circuitry may be advantageous for some embodiments are described below. Each TLB entry 320 includes bits for storing a particular PTE 304 that has been copied from the page table 302. Designated bits of the virtual page number in a PTE 304 (e.g., high order bits) are used as a "tag" for comparison that is performed N times (possibly in parallel) for a selected set (i) determined (using a direct mapping) by designated "index" bits of the virtual page number (e.g., low order bits). The comparison is performed once for each of N "ways" in which a PTE containing the desired translation may be stored (where N=4 in FIG. 3). If the tag matches for one of the ways of the selected set (i.e., a "TLB hit"), then the PTE stored in that entry is used for translation. If the tag does not match for any of the ways of the selected set (i.e., a "TLB miss"), then a page table walker is used to retrieve the translation from the page table 302.

Often applications that access a large portion of memory, require significant TLB reach. TLB reach refers to the amount of memory mapped by a TLB. For example, for a 64-entry TLB caching 4 KB pages, the TLB reach would be 64×4 KB=256 KB. One possible technique for increasing the TLB reach is by increasing the page size. Another possible technique increases the TLB reach by increasing the TLB size (i.e., the number of TLB entries). For example, a 64 KB page size and 2048 TLB entries can map approximately 131 MB of memory.

There are potential design challenges associated with increasing TLB size, in particular for enabling efficient invalidation of multiple TLB entries in response to a TLBI instruction. This can occur, for example, if a TLBI instruction for a specific context, such as virtual machine, needs to invalidate all of the virtual machine's translations (e.g., on a virtual machine tear down). A TLB can be configured to use a fully associative cache structure in which a particular virtual address can potentially be stored in any of the entries (e.g., as opposed to a direct-mapped cache structure, where a particular virtual address is mapped to a particular entry).

For example, a fully associative cache structure can be implemented using a content-addressable memory (CAM) that searches all of the TLB entries in parallel. When invalidating translations for a virtual machine with a particular virtual machine identifier (VMID), for example, the CAM may perform a search operation against bits storing a VMID within context information of a TLB entry, and then invalidate all TLB entries that result in a match. In some CAM implementations, multiple matches (or "hits") are read out in parallel, and in other CAM implementations multiple matches are read out serially, over consecutive clock cycles. However, a fully associative TLB (i.e., a TLB that uses a fully associative cache structure) may be difficult to manufacture at a large size and may use a significant amount of power because every TLB entry is being accessed in each search operation. If CAM circuitry supports more than about 256 entries, for example, the power used may impact the power efficiency, or the latency needed may to access such a large number of entries may impact the performance. Also, the cost of manufacturing a large fully associative TLB module (e.g., 2048 entries or more) may be prohibitive.

A set associative cache structure may be easier to manufacture at a large size than a fully associative cache structure. For example, there may be an 8-way set associative circuitry with 256 sets each set having 8 ways, which can be used build a 2048-entry TLB. However, there may be various challenges associated with such a set associative cache structure used for a TLB when multiple different pages sizes are supported. Various processor architectures support multiple page sizes. For example, there may be 9 different pages sizes, where the smallest page size is 4 KB and the largest page size is 4 TB. When the page size changes, so does the number of bits of the virtual address that are used for the page offset (the lowest order bits) and the number of bits of the virtual address that are used for the virtual page number (the remaining high order bits). (Note that, in some implementations, the terms "block" and "block size" are used to refer to the addressable chunks of memory in a processor architecture instead of "page" and "page size", and the term "page" is instead reserved for a unit of memory that may be determined by software, where (potentially complex) pages can be created out of multiple blocks. As used herein, the terms "page" and "page size" will refer to portions of memory addressed by virtual and physical addresses according to a processor architecture.)

Figure 4:
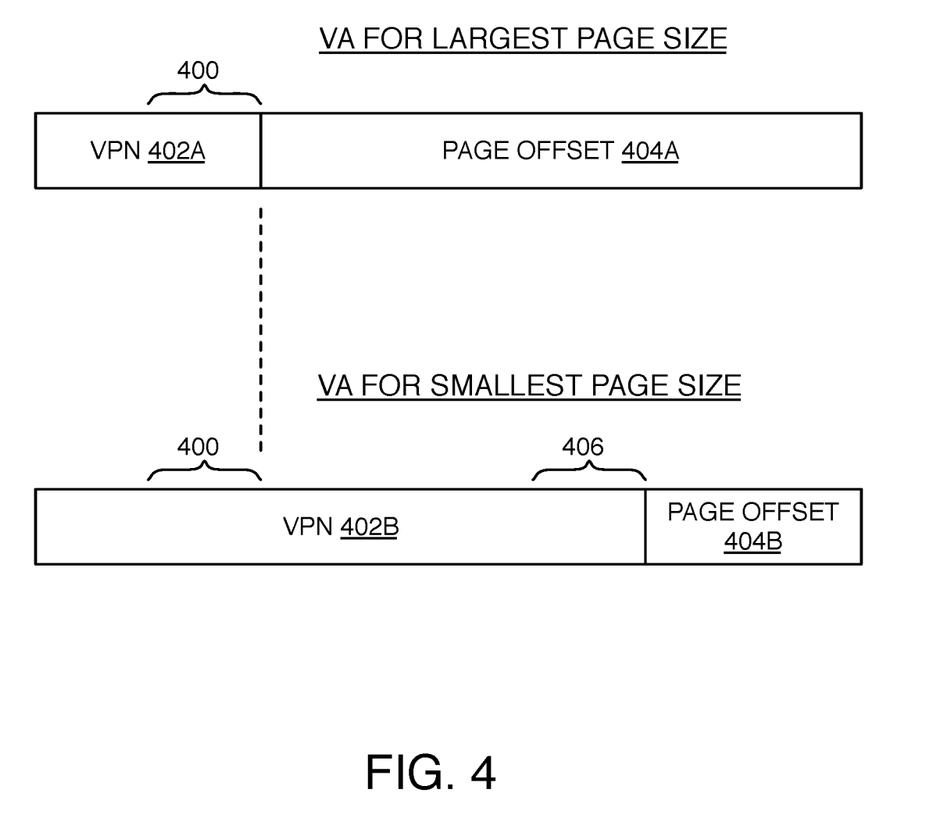
FIG. 4 is a schematic diagram of different bit positions of a virtual address for different page sizes.

One challenge involves determining how the index bits, which determine the set number, are to be selected for a particular virtual address if the page size for that virtual address is not known at the time the TLB is accessed. For example, as shown in FIG. 4, the index bits could be mapped to a group of bits 400 of the virtual address that correspond to low order bits of a VPN 402A that are just beyond the page offset bits 404A for the largest page size (e.g., starting at bit 32 for a 4 TB page size, for bits numbered consecutively with bit "0" being the lowest order bit). The number of bits in the group of bits 400 is determined by the number of sets (e.g., for 256 sets there would be 8 bits in the group forming an 8-bit index value). These particular bit positions would be guaranteed to fall within the VPN no matter what the page size, since smaller page sizes would have fewer page offset bits and more VPN bits. The tag bits would then consist of higher order bits than the group of bits 400. This scenario in which a fixed set of bit positions is used to determine the index bits would provide a mapping to a particular set (based on the index value) in a manner that is independent of page size.

However, in such a scenario, pages may end up mapping to a small number of sets when there are processes that use pages sizes smaller than 4 TB. For example, the same group of bits 400 would correspond to higher order bits of a VPN 402B of the smallest page size (e.g., a 4 KB page size). These higher order bits would be identical for a larger number of pages, mapping those pages to the same index value, and therefore to the same set. This would make sets that are mapped to a smaller number of pages (or mapped to no pages) less populated, potentially resulting in an under-utilized TLB. Instead, for the smallest page size, it may be more effective in some embodiments to map the index to a group of bits 406 that are just beyond the page offset bits 404B for that page size (e.g., starting at bit 12 for a 4 KB page size). Similarly, for a 64 KB page size, the index can be mapped to a group of bits that start at bit 14, and so forth.

Before the TLB is probed to find a PTE that translates a particular virtual address, a mask can be used to select the VPN portion of the PTE for that virtual address from which the appropriate bits from that VPN can be selected as the index bits and tag bits. But, from the virtual address alone, the MMU 300 may not be able to determine the page size, and thus may not be able to determine the mask that correctly selects the VPN portion of the PTE. Different techniques can be used to find the "correct mask" that correctly selects the VPN portion of the PTE based on the page size corresponding to the virtual address translated by that PTE. In a mask-storage technique, the correct mask for a given PTE is stored in a TLB entry along with that PTE. But, such additional storage for the mask call for more space on the integrated circuit. In a multiple-iteration technique, different masks can be used for each iteration, where only a single iteration uses the "correct" mask that correctly selects the VPN portion of the PTE, as described in more detail below. But, such multiple iterations call for more time to probe the TLB. Thus, there is a chip space vs. latency tradeoff associated with these different techniques.

Some embodiments use an implementation of the TLB that combines the mask-storage technique and the multiple-iteration technique in a synergistic manner that provides advantages over either technique used alone. For example, a relatively large number of TLB entries may be needed when the page size is relatively small. As introduced above, TLB modules TLB1 and TLB2 can be used where TLB1 is implemented using fully associative cache circuitry, and the TLB2 is implemented using N-way set associative cache circuitry. TLB2 can be configured for storing a relatively large number of entries (e.g., 2048 entries) for smaller page sizes (e.g., 4 KB, 16 KB, and 64 KB), and TLB1 can be configured for storing fewer entries (e.g., 64 entries) for larger page sizes (e.g., all 6 other page sizes larger than 64 KB) with storage space for storing the correct mask for each entry. In some implementations, the assignment of page sizes to one or both of the TLB modules is configurable using software.

When searching for a page table entry PTE1 with a translation for a particular virtual address with a virtual page number VPN1 (e.g., for an address-based TLBI instruction), using the combined mask-storage/multiple-iteration technique, the MMU 300 can probe TLB1 in parallel with an initial iteration of probing TLB2 using the smallest page size (of 4 KB). If VPN1 is found (i.e., a TLB hit using the index and tag for VPN1) in either TLB1 or TLB2, then no additional iterations are needed for probing TLB2. If VPN1 is not found in the first dual probe of TLB1 and TLB2, then TLB2 is probed again in additional iterations using successively larger pages sizes (of 16 KB, and then 64 KB). Using this technique, there will be at most a single TLB hit for the desired VPN1 in only one of TLB1 or TLB2, and in only one of the iterations of probing TLB2. In implementations in which the page sizes increase for each iteration, as in this example, as soon as there is a TLB hit for a particular page size, it is not possible to get a hit for a larger page size. (If there were a TLB hit for multiple page sizes, that would mean the same address is mapped to two different pages, of different sizes, which would typically be incorrect behavior.) This combination of fully associative TLB1 for larger page sizes, and a set associative TLB2 for smaller page sizes is a synergistic combination because the smaller page sizes are associated with a larger number of translations because they have a smaller reach. Thus, the larger size of the set associative TLB2 can accommodate those translations. Whereas, the larger page sizes are associated with a smaller number of translations because they have a larger reach. So, the speed achieved by the fully associative TLB1 is worth the size tradeoff.

When establishing a translation from a particular virtual address to a particular physical address or intermediate physical address, various types of context information is used to distinguish otherwise identical virtual addresses from each other. This enables multiple independent virtual address spaces to exist for different processes or different virtual machines or any of a variety of other differentiating characteristics that support different virtual address spaces. Various portions of the context information can be used for differentiating between virtual addresses that are in use within different VA-to-PA translations, or VA-to-IPA translations, or IPA-to-PA translations. For example, an operating system may use an address space identifier (ASID) (e.g., 16 bits) to identify a memory space (a virtual address space) associated with a running process. A hypervisor may use a virtual machine identifier (VMID) (e.g., 16 bits) to identify a memory space (intermediate physical address space) associated with a guest operating system of a virtual machine. Certain parameters may be associated with different classes of processes or software environments that are available in an architecture, such as a security state with values of secure (S) or non-secure (NS), or an exception level (also called a 'priority level') with values of EL0-EL3 (for a 2-bit exception level), for example. All of this context information together comprises a context (also called a "translation context" or a "software context") for a particular virtual address.

In some cases, the MMU 300 searches for multiple page table entries, implicitly, in response to a TLBI instruction based on context information, for example. Instead of a virtual address (as in an address-based TLBI), a "context-based" TLBI specifies a context, and any PTEs associated with that context are to be invalidated. One way to handle a context-based TLBI would be to invalidate the entire TLB (both the TLB1 and TLB2). However, such overkill may invalidate entries that are still being used, and thus may be counterproductive. The fully associative TLB1 can be probed in a single cycle. In some implementations, the set associative TLB2 is probed by iterating the index value through all the sets, one at a time, to find any entries that have stored context information that matches the context being invalidated, and invalidates the corresponding entries. This context search approach for invalidating a context-based TLBI in a TLB module having a set associative cache structure, however, may take a relatively large number of cycles. For example, for 256 sets the search would take 256 cycles.

Alternatively, in other implementations for handling context-based TLBIs, the processor core 102 includes circuitry for a data structure that stores context identifiers identifying contexts that are active (i.e., in use). In these implementations, when a particular context needs to be invalidated, the MMU 300 invalidates the appropriate context identifier. This invalidation of context identifiers implicitly invalidates any PTEs corresponding to any invalided context identifiers. In these implementations, the TLB entries themselves do not explicitly store information indicating invalidity of those entries, but the stored context is associated with a context identifier in the data structure that indicates invalidity of those entries.

A context identifier (CID) may represent either the full context information or partial context information. In some architectures, for example, the full context information may include 35 bits for: 2-bit exception level (EL), 1-bit non-secure/secure (NS/S) value, 16-bit VMID, and 16-bit ASID. But, there is potentially significant overhead in terms of integrated circuit area devoted to storage for the data structure that tracks validity for different CIDs. To reduce the overhead, the CID can include partial context information, such as only the 16-bit VMID and the 2-bit EL. Such partial context information would uniquely identify different subsets of contexts.

Alternatively, instead of simply concatenating subsets of bits from the full context information, techniques can be used to essentially compress full context information into fewer bits. Circuitry that computes the CIDs can be configured to include fewer bits than the full context information, where those bits are assigned based on a stored mapping between CIDs and a corresponding full context information string. While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Other embodiments are within the scope of the following claims.

What is claimed is:

1. An integrated circuit comprising:
a first cache module comprising fully associative cache circuitry, the first cache module configured to provide translation lookaside buffer (TLB) entries storing copies of translations mapping virtual pages to physical pages for a first group of multiple page sizes, and configured to search for a TLB entry storing a translation corresponding to a first provided virtual address based on tag bits of the first provided virtual address;
a second cache module comprising set associative cache circuitry, the second cache module configured to provide TLB entries storing copies of translations mapping virtual pages to physical pages for a second group of multiple page sizes, and configured to search for a TLB entry storing a translation corresponding to a second provided virtual address based on index bits of the second provided virtual address and tag bits of the second provided virtual address; and
circuitry configured to manage TLB entries in the first and second cache modules, the managing including:
receiving a target virtual address,
performing a search in the first cache module based on selected tag bits of the target virtual address that are selected for each TLB entry in the first cache module based on information stored in the first cache module corresponding to one of the multiple page sizes in the first group, and
performing multiple search iterations in the second cache module, where each of at least a first search iteration and a second search iteration uses one or more selected index bits and one or more selected tag bits of the target virtual address, and where respective quantities of bits in the selected index bits and the selected tag bits are different for each of the first and second search iterations.

2. The integrated circuit of claim 1, wherein receiving the target virtual address comprises receiving a TLB invalidation instruction for invalidating at least one translation corresponding to the target virtual address.

3. The integrated circuit of claim 1, wherein each of the multiple search iterations is performed based on a different one of the multiple page sizes in the second group.

4. The integrated circuit of claim 3, wherein the multiple search iterations are performed based on successively larger page sizes.

5. The integrated circuit of claim 1, wherein a total quantity of TLB entries provided by the second cache module is greater than a total quantity of TLB entries provided by the first cache module, and a maximum page size of the second group of multiple page sizes is smaller than a minimum page size of the first group of multiple page sizes.

6. The integrated circuit of claim 1, wherein the page sizes in the second group of multiple page sizes is configurable based on instructions executed in a processor in the integrated circuit.

7. The integrated circuit of claim 6, wherein the page sizes in the first group of multiple page sizes is configurable based on instructions executed in the processor in the integrated circuit.

8. The integrated circuit of claim 1, wherein the search in the first cache module and an initial search iteration in the second cache module are performed at least partially concurrently.

9. The integrated circuit of claim 1, wherein the information stored in the first cache module corresponding to one of the multiple page sizes in the first group indicates which bits of the first provided virtual address correspond to a virtual page number.

10. The integrated circuit of claim 9, wherein the information stored in the first cache module corresponding to one of the multiple page sizes in the first group comprises a bit mask in each TLB entry in the first cache module storing a valid translation.

11. A method comprising:
providing, from a first cache module comprising fully associative cache circuitry, translation lookaside buffer (TLB) entries storing copies of translations mapping virtual pages to physical pages for a first group of multiple page sizes, and searching for a TLB entry in the first cache module storing a translation corresponding to a first provided virtual address based on tag bits of the first provided virtual address;
providing, from a second cache module comprising set associative cache circuitry, TLB entries storing copies of translations mapping virtual pages to physical pages for a second group of multiple page sizes, and searching for a TLB entry in the second cache module storing a translation corresponding to a second provided virtual address based on index bits of the second provided virtual address and tag bits of the second provided virtual address; and managing TLB entries in the first and second cache modules, the managing including:

receiving a target virtual address, performing a search in the first cache module based on selected tag bits of the target virtual address that are selected for each TLB entry in the first cache module based on information stored in the first cache module corresponding to one of the multiple page sizes in the first group, and performing multiple search iterations in the second cache module, where each of at least a first search iteration and a second search iteration uses one or more selected index bits and one or more selected tag bits of the target virtual address, and where respective quantities of bits in the selected index bits and the selected tag bits are different for each of the first and second search iterations.

12. The method of claim 11, wherein receiving the target virtual address comprises receiving a TLB invalidation instruction for invalidating at least one translation corresponding to the target virtual address.

13. The method of claim 11, wherein each of the multiple search iterations is performed based on a different one of the multiple page sizes in the second group.

14. The method of claim 13, wherein the multiple search iterations are performed based on successively larger page sizes.

15. The method of claim 11, wherein a total quantity of TLB entries provided by the second cache module is greater than a total quantity of TLB entries provided by the first cache module, and a maximum page size of the second group of multiple page sizes is smaller than a minimum page size of the first group of multiple page sizes.

16. The method of claim 11, wherein the page sizes in the second group of multiple page sizes is configurable based on instructions executed in a processor in an integrated circuit.

17. The method of claim 16, wherein the page sizes in the first group of multiple page sizes is configurable based on instructions executed in the processor in the integrated circuit.

18. The method of claim 11, wherein the search in the first cache module and an initial search iteration in the second cache module are performed at least partially concurrently.

19. The method of claim 11, wherein the information stored in the first cache module corresponding to one of the multiple page sizes in the first group indicates which bits of the first provided virtual address correspond to a virtual page number.

20. The method of claim 19, wherein the information stored in the first cache module corresponding to one of the multiple page sizes in the first group comprises a bit mask in each TLB entry in the first cache module storing a valid translation.

21. The method of claim 11, wherein the first provided virtual address and the second provided virtual address are the same virtual address.

* * * * *